E. VERMILYEA & R. HAMMERSLEY.
KNITTING MACHINE.
APPLICATION FILED MAR. 31, 1909.

970,282.

Patented Sept. 13, 1910.

Witnesses

Inventors
E. Vermilyea
R. Hammersley

Attorney

E. VERMILYEA & R. HAMMERSLEY.
KNITTING MACHINE.
APPLICATION FILED MAR. 31, 1909.

970,282.

Patented Sept. 13, 1910.
9 SHEETS—SHEET 4.

E. VERMILYEA & R. HAMMERSLEY.
KNITTING MACHINE.
APPLICATION FILED MAR. 31, 1909.

970,282.

Patented Sept. 13, 1910.
9 SHEETS—SHEET 5.

Witnesses

Inventors
E. Vermilyea
R. Hammersley

Attorney

UNITED STATES PATENT OFFICE.

EUGENE VERMILYEA AND RALPH HAMMERSLEY, OF WATERFORD, NEW YORK.

KNITTING-MACHINE.

970,282.  Specification of Letters Patent. Patented Sept. 13, 1910.

Application filed March 31, 1909. Serial No. 487,055.

*To all whom it may concern:*

Be it known that we, EUGENE VERMILYEA and RALPH HAMMERSLEY, citizens of the United States, residing at Waterford, in the county of Saratoga and State of New York, have invented certain new and useful Improvements in Knitting-Machines, of which the following is a specification.

This invention relates to improvements in knitting machines, designed primarily for making fleeced lined fabric, such for instance as shown in our Patent No. 876,750, dated Jan. 14, 1908, although it is not limited to the production of this particular class of goods.

In the organization of our mechanism we provide two sets of needles, which knit at widely distant points, and intermediate mechanism coöperating with one set of said needles for laying in a fleecing yarn, the object being to produce a fabric composed of two sets of independent loops formed from separate yarns, and visible on but one face, the opposite face being fleeced lined.

A further object of our invention is to arrange two sets of latch needles having all their hooks projecting substantially in the same direction and operating to knit on separate yarns, and in addition means which coöperates with but one set of said needles to lay in between the wales of the knit loops, a fleecing or backing yarn.

A further object of our invention is to provide means operating on the backs of a series of circular needles to place a fleecing yarn, first on the front of certain of said needles, and then on the backs of the remaining needles in the series, whereby the said yarn will subsequently be laid in between the usual knit loops.

Our invention further consists in arranging a circular series of horizontally disposed dial needles outside of, and above the normal plane of a circular series of inclined needles disposed in a conical bed, both series of needles having their hooks projecting in the same direction and operating on separate yarns, and at different points, to draw all the knit loops to one face of the fabric.

A further object of our invention is to provide mechanism for knitting a fabric from a series of yarns, all of the knit loops of which appear on but one face, and the loops of each yarn drawn through loops of its own kind, and mechanism coöperating therewith for laying in a fleecing or backing yarn between certain of the knit stitches on the opposite face of the fabric.

In the drawings: Fig. 11$^a$, is a similar view of the remaining half of the said cylinder needles, and the operating cams. Fig. 12$^a$, is a similar view of the other half of said needles, and arranged under the half of the cylinder needles shown in Fig. 11$^a$, to illustrate the relative operative location of said needles. Figs. 14, and 14$^a$, are detail views of an adjustable cam, operating in connection with the cylinder needles. Fig. 15, is a detail view of the dial needle operating cam.

The numeral 1, indicates a suitable frame, in which is mounted a power shaft 2, carrying fast and loose pulleys, and a beveled gear 3. On the top of the frame is supported a stationary conical needle bed 4, provided on its outer face with a series of grooves 5. In these grooves operate two sets of needles 6 and 6$^a$, provided with the usual hooks 7, and latches 7$^a$. We use the term two sets of needles, to conveniently define the operation in the description to follow, although both sets of needles are exactly alike, except each needle in set 6 has a single butt 8, while each needle of the other set 6ª, has two butts 9, and 9ª. For convenience, we will also refer to the needles in the conical bed 4, as "cylinder needles" to simplify the description as much as possible.

An annular frame 10, on the top of the frame adjacent the bed 4, forms a base for a second annular band 11, which rests against the outer inclined surface of the bed to provide a retaining means for the lower ends of the cylinder needles, and a support for the butts. The periphery of the flange 10 is provided with gear teeth, and meshing therewith is a pinion 15, mounted on a vertical shaft 16, the latter having a beveled pinion at its lower end, which meshes with the beveled gear 3. The band 11, revolves with the flange 10, and carries a series of cams, which operate the two series of needles 6 6ª. The needles of the dial and cylinder are operated to knit at determinated points, widely separated, and the needles of the cylinder are positioned to be operated upon to accomplish the engagement of the fleecing yarn with the fabric being formed between said points.

17, indicates a cam designed to engage the butts 8 and 9, and in rear of this cam is a second cam 18, positioned to contact with the upper butts 9ª, of the set of needles 6ª to further elevate them. This action therefore elevates the set of needles 6ª, which are disposed between the set 6, above the latter, to permit of the proper placing of the backing or fleecing yarn, c, as will appear farther on. The needles are retained in this elevated position for a short period, when the butts 9, are engaged by a third cam 19, to draw the needles 6ª, down to a level with the needles 6.

20, indicates a knitting or stitch cam of special construction which engages the butts 8, and 9, and draws both sets of needles down to their lowest position. The knitting or stitch cam 20, comprises a base 21, provided with an adjusting screw 22, and an inclined member 23, formed with slots 24 and a series of threads 25. Bolts 26, pass through the slots 24, and into the base 21, to set the cam; the adjustment being effected by the screw 22, engaging the threads 25. This adjustment is quite essential that the needles may be properly elevated, and at the proper time returned to normal position to effectually cast off the stitches. For the purpose of making the operation of the machine as clear as possible, we have shown the cams spread out, but in actual practice they may be much closer together.

Supported by brackets on the top of the frame 1, is a supplemental frame 30, located on a plane with the upper end of the conical bed 4. The supplemental frame forms a support for the dial needles 32, which operate in a horizontal plane just above the upper edge of the cylinder needles. Operating on the top of the supplemental frame is a dial cam ring 33, provided on its periphery with gear teeth 34, which mesh with a pinion 35 on the upper end of the shaft 16. The dial cam ring is concentric for a greater part of its circumference, and is interrupted at two or more different points for the purpose of projecting and retracting the dial needles to form knit stitches, and also retracting them slightly to readily permit the previously formed stitches to be cast off the cylinder needles. The first interruption comprises two movable cams 36, and 37. The needle projecting cam 37, is pivoted at 38, and may be turned to destroy the cam effect to prevent operation of the dial needles. The retracting or stitch cam 36, is pivoted at 39, and has connected to it a spring 40, which will yield should an obstruction be interposed in the path of movement of the butts on the dial needles, and thereby avoid breaking of the parts. The second cam or interruption mentioned, indicated at 42, is very slight, and is for the purpose of slightly retracting the dial needles from the cylinder needles at the time the latter cast off their knit stitches, to avoid entanglement of the yarns. The hooks of all the cylinder and dial needles point outwardly or upwardly to draw the stitches to the outside of the fabric, as in our machine, we provide separate yarn for each series of needles, and as previously stated each needle of its respective series is operated to knit at a point distant from the knitting point of the companion series.

On the underside of the supplemental frame are adjustably secured several notched plates 45, designed to bear lightly on the cylinder needles to brace the same during the knitting operation. These plates may be provided with ribs 46, to fit in grooves 47, and also with fingers to afford convenient means for adjustment.

Adjustably supported on the support 62, at the point where the series of cylinder needles 6, and 6ª, are elevated, one set in a higher plane than the other, is a sinker wheel 48. This wheel is provided with a series of wings, which are grooved on their outer edges to provide a grooved periphery 49, in which the fleecing yarn is seated to be directed onto the needles. The wings of the wheel are set at an angle to the axis, and the latter is angularly mounted so as to permit of the placing of the backing yarn, on the backs of the most elevated needles and then over the heads and into the hooks and therefore in front of the next adjacent needle which has not been elevated by the cam 18. The fleecing yarn is directed to the grooved periphery of the sinker wheel by a guide 50, and by the time the yarn straddling the wings reaches the first high needle of the set 6ª, said needle will assume a position in front of the yarn. As the wheel continues to revolve in an inclined direction, the yarn straddling the next succeeding wings, will be somewhat out of the plane from where the aforesaid high needle of the set 6ª, took it, and will be in position for the next needle, which is of set 6, to pass back of said yarn, and so on until the yarn is laced, first in rear, and then in the front of the two sets of circular cylinder needles. It will therefore be seen that by placing the sinker wheel on the backs of the needles, and operating the latter as described, the fleecing yarn will be positively directed in the rear of all the sets of needles 6ª, and in front of all the set of needles 6.

Located slightly in advance of the point where the cylinder needles are operated upon by the knitting or stitch cam 20, to knit the cylinder yarn a, is a clearing wheel 52, having the usual wings 53, working between the needles and adjustably mounted on the support 62. The wings are angularly disposed to the axis, and the wheel is arranged at an angle in the usual manner. This wheel is designed to force the fleecing yarn c, below the bottoms of the latches 7, of the cylinder needles so that as the latter are drawn down to knit, they will readily cast off the laced fleecing yarn, that it may be laid in behind one wale and in front of the next wale of the knit stitches from the cylinder needles only.

A shaft 60, is mounted in a frame 61, extending up from the dial cam ring 33, the lower end of said shaft carrying the support 62, on which are mounted the sinker and clearing wheels 48, and 52. Posts 63, extend up from the supplemental frame, and carry a track provided with rollers 64, on which travels a yarn carrying ring 65, mounted on the post 60. At the upper end of the post 60, are yarn guides 66. The yarn from the bobbins 67, passes through the guides 66, thence through other guides 67, to the respective knitting points. Just in advance of the clearing wheel and at a point before the cylinder needles descend to knit, is a guide 68, to direct the cylinder yarn a, in the path of the hooks of said needles.

A yarn guide 69, is arranged just over the point where the dial or horizontal needles are projected over the path of the cylinder needles, to direct the dial yarn b, to the hooks of said dial needles, so that when the latter are retracted they will draw in the yarn to form the knit stitches. This yarn guide 69, is pivoted at 70, and has a depending presser foot 71, beveled on its forward edge, and normally forced downwardly by a spring 72. The function of the presser foot 71, is to rest slightly on the projected needles 32, while they are being supplied with yarn which prevents them springing up and causing entanglement of the loops.

Figures 16, 18:
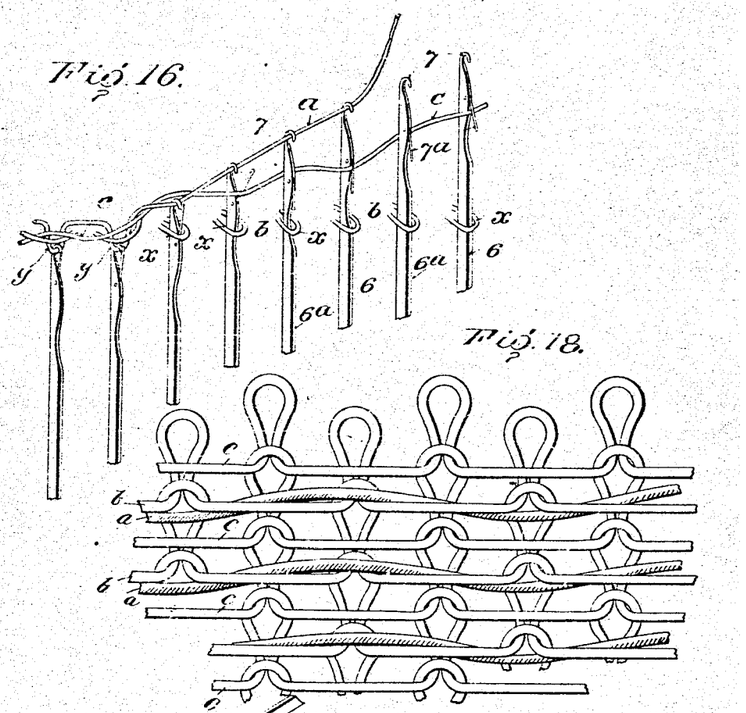
Fig. 16, is a diagrammatic view of the cylinder needles, to better illustrate the knitting operation.
Fig. 18, is a diagram of a portion of the knit fabric.

In operation, the several spools of yarn are placed on the bobbins 67; b, indicating the dial yarn; a, the cylinder yarn; and c the fleecing yarn. The dial needles are first rendered inoperative by throwing out the needle projecting cam 37, and the yarns a, and b, are fed to the cylinder needles; dial yarn b, being passed through the guide 69, and thence to the hooks of the needles 32. The cylinder yarn a, is directed through guides 68, in front of the hooks 7, to be caught thereby and drawn down, as will be described. The yarns a—b, having been positioned, the needle projecting cam 37, is thrown into operative position, and then the fleecing yarn c, is directed through the guide 50, and thence around the grooved periphery 49, of the sinker wheel and into the path of the cylinder needles 6, and 6ª. Considering the action of the cylinder needles first, with reference to the knitting operation, attention is directed to Fig. 16. As previously stated the cylinder yarn a is directed over the front of the cylinder needles when held in elevated position by the cam 17, and is drawn down to form the knit loops, by the knitting or stitch cam 20. When the yarn is first positioned over the face of the needles the latches are projected, and as said needles descend (under the influence of the cam 20,) the latches are closed by the previously formed stitches x and the cylinder yarn a, is caught between the hooks and the ends of the latches to form the next or new stitches y, as shown in Fig. 16. It is at this time the fleecing yarn c, is laid in, in the following manner. The fleecing yarn c, is passed through its guide 50, and around the periphery of the sinker wheel 48, and by reason of the angular disposition of the same, as well as the inclination of the cylinder needles, the set 6ª, of the latter, which are now elevated by the cam 18, above the tops of the second set 6, will receive said yarn on their rear faces, while the set 6, will be positioned so that their hooks will pass in the horizontal plane of the center of the inclined sinker wheel, so that they penetrate the planes defined by the yarn lying on the periphery of the wheel and pass up back of the yarn and will receive same on their front faces. It will of course be understood the latches of all the needles are at this time open. The fleecing yarn is therefore placed, behind all the needles in set 6ª, and in front of all of the other set 6, the relative position of the two sets of needles, and the fleecing yarn, when the latter is being taken, being shown in Fig. 10.

Figure 9:
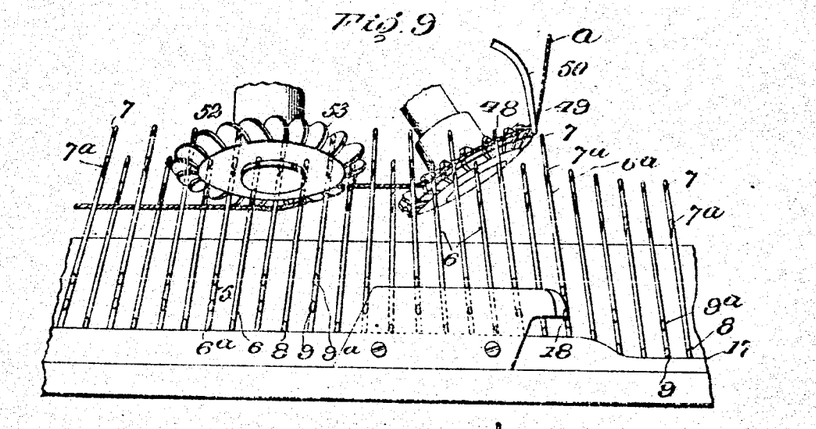
Fig. 9, is a detail enlarged side elevation of the sinker wheel, and clearing wheel, and the cylinder needles.

The two sets of needles 6, and 6ᵃ, remain in this position, with the fleecing yarn placed thereon as described, until the butts 9ᵃ of the set 6ᵃ, encounter the cam 19, which draws set 6ᵃ, down to a level with the set 6, as indicated at the left of Fig. 9. Just about the point where the change in positions of the two sets of needles 6, and 6ᵃ, takes place, the clearing wheel 52, on the outside of said needles comes into operation and forces the fleecing yarn c, down below the lower ends of the latches 7ᵃ, as shown in Fig. 9, and the tension of the yarn causes the latter to pull up slightly back of the latches immediately the clearing wheel is passed. It will be apparent by reference to Fig. 16, that the cylinder yarn a, is located over the plane of the fleecing yarn c, from guide 68, so that as the needles are drawn down the yarn a, will be knit into the fabric while the yarn c, will be laid in alternately above and below the connecting yarn or sinker wale while passing between the wales knit by the needles 6 and 6ᵃ.

Figure 10:
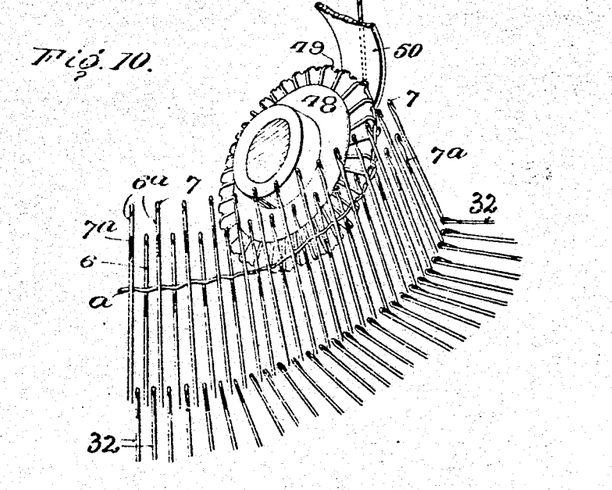
Fig. 10, is a detail perspective view showing the sinker wheel directing the fleecing yarn to the cylinder needles.
Figure 11:
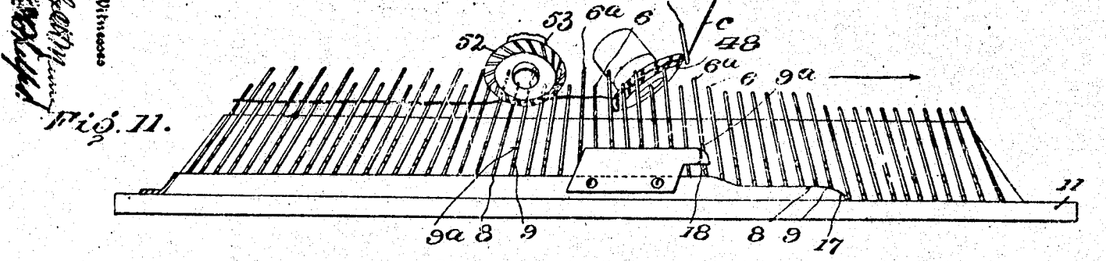
Fig. 11 is a diagrammatic view of half the cylinder needles and their cams.
Figures 11A, 12A:
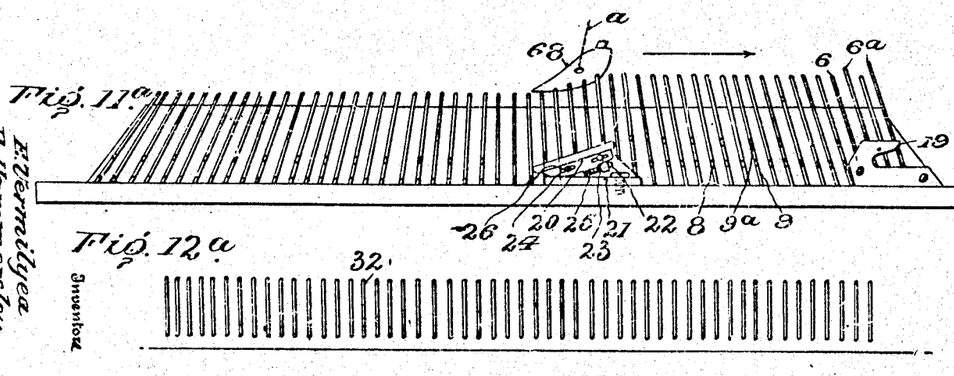
Figure 12:
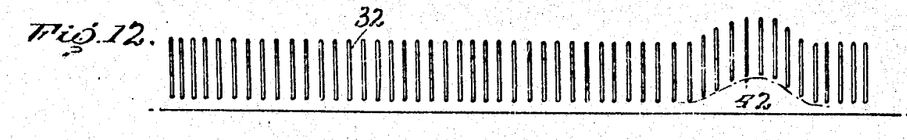
Fig. 12, is a diagrammatic view of half the dial needles, flattened out, and arranged directly under the cylinder needles shown in Fig. 11, to illustrate their relative operative position with relation to said needles.
Figure 13:
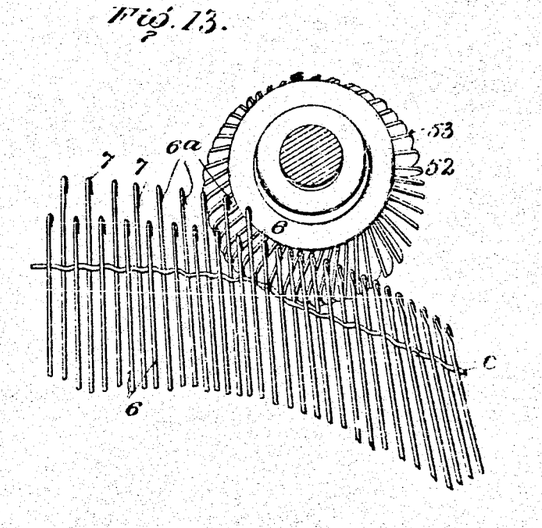
Fig. 13, is a detail perspective view looking from the inside of the cylinder needles, to illustrate the action of the clearing wheel.
Figures 14, 14A, 15:
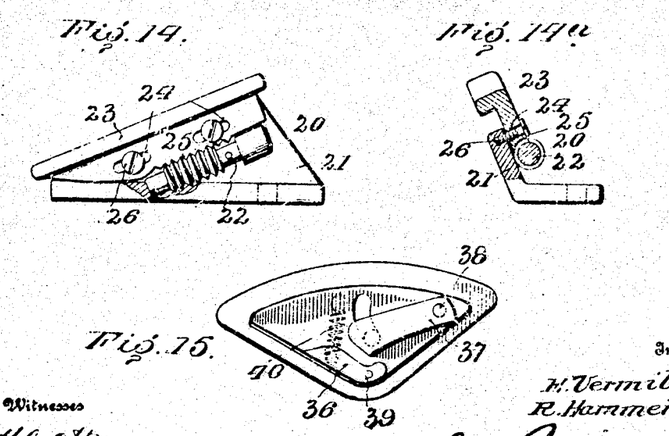

The description thus far brings the cylinder yarn, and the fleecing yarn in position to be drawn into the fabric and it is at this point it is important to fully comprehend the manner in which the previous stitches are cast off, the new ones formed, and the fleecing yarn laid in. It has been previously explained how the cylinder yarn is pulled down, and this must be borne in mind in explaining the laying in of the fleecing yarn. When the cylinder needles 6, and 6ᵃ, are drawn down below the level of the horizontal needles by the knitting or stitch cam 40, the cylinder yarn a, is held between the latches and the hooks while the fleecing yarn c, is laid in alternately, in front of one set 6ᵃ, and in rear of the other set 6, of the cylinder needles as shown in Figs. 9, and 10. The former stitches x, now on the cylinder needles are cast off, when the needles are drawn through the new loops y, over the closed latches, immediately said needles are pulled down far enough. This operation also casts off the fleecing yarn which is tied to the back of the fabric by the connecting legs of the loops formed by the cylinder needles. The usual winding mechanism pulls the knit fabric down on the inside of the cylinder, the fleecing yarn being tied twice by the cylinder yarn between every three rows of loops of the fabric, as fully set forth in our patent previously mentioned. When the cylinder needles 6, and 6ᵃ, are operated to knit. the cam 42, acts on the butts of the dial needles, and slightly withdraws them. This operation is simply for the purpose of allowing plenty of space for the cylinder needles to cast off their stitches.

The operation of placing the cylinder and fleecing yarns having been completed, we will now describe the manner in which the dial yarn is placed in the knit fabric.

Figure 1:
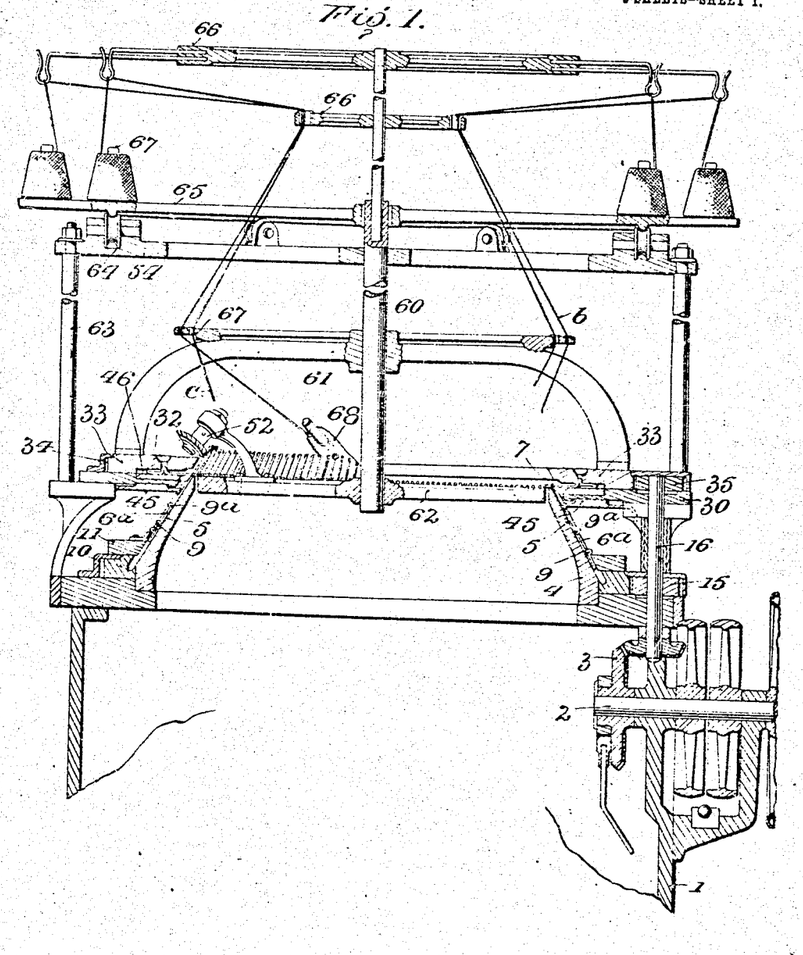
—Figure 1, is a vertical section of our improved knitting machine.
Figure 2:
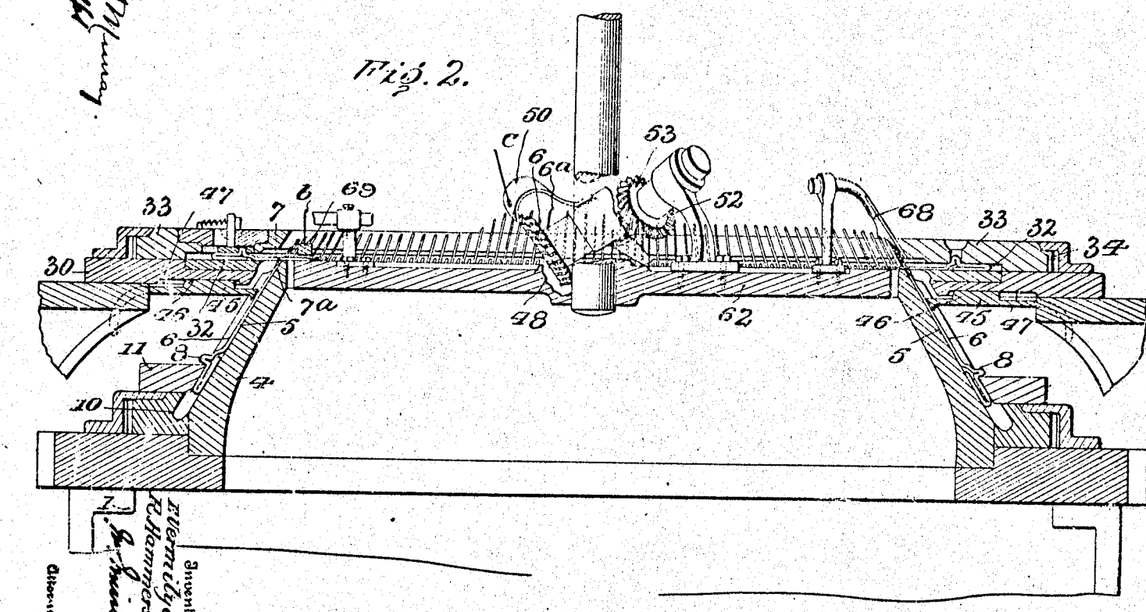
Fig. 2, is a similar view of the main operative portion of the machine on an enlarged scale on the line 2—2 Fig. 3.
Figure 3:
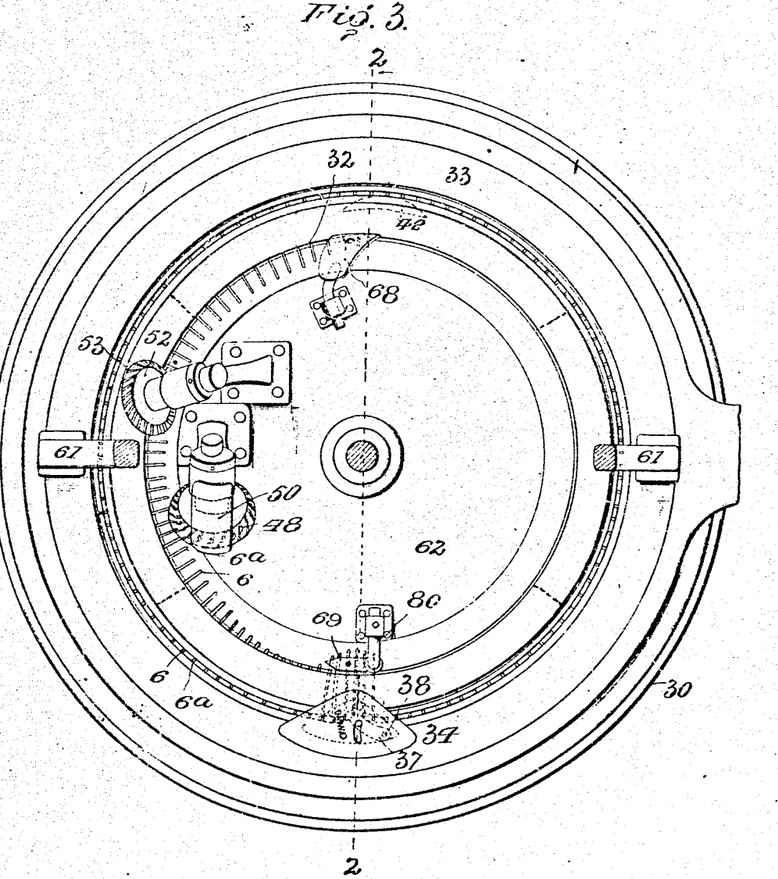
Fig. 3, is a plan view, the upper part of the machine being removed.
Figure 4:
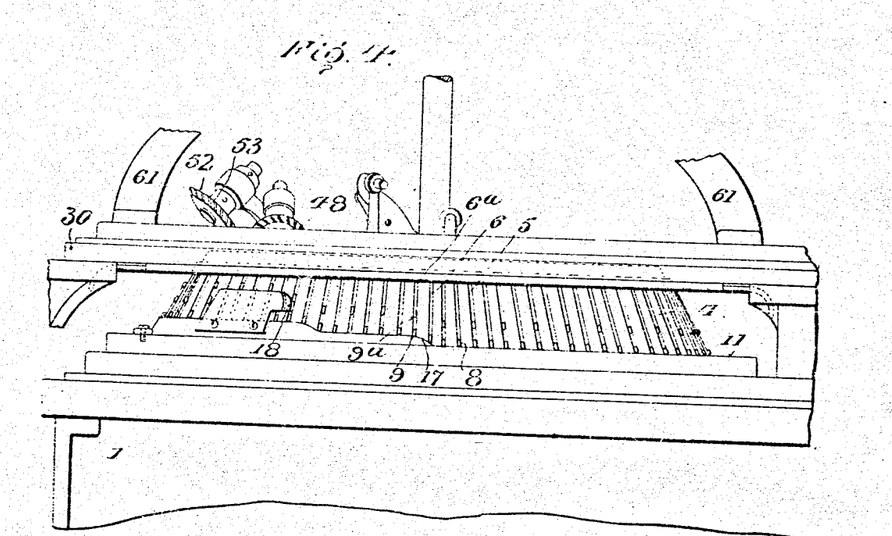
Fig. 4, is a side elevation of a part of the machine.
Figure 5:
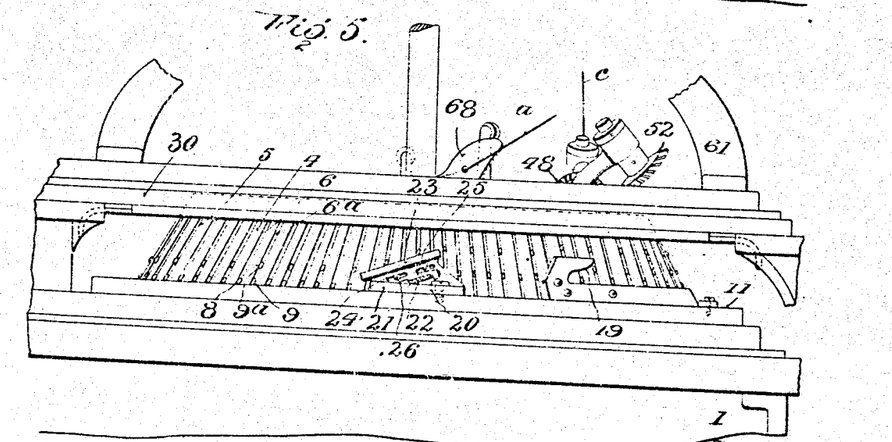
Fig. 5, is a similar view at right angles thereto.
Figure 6:
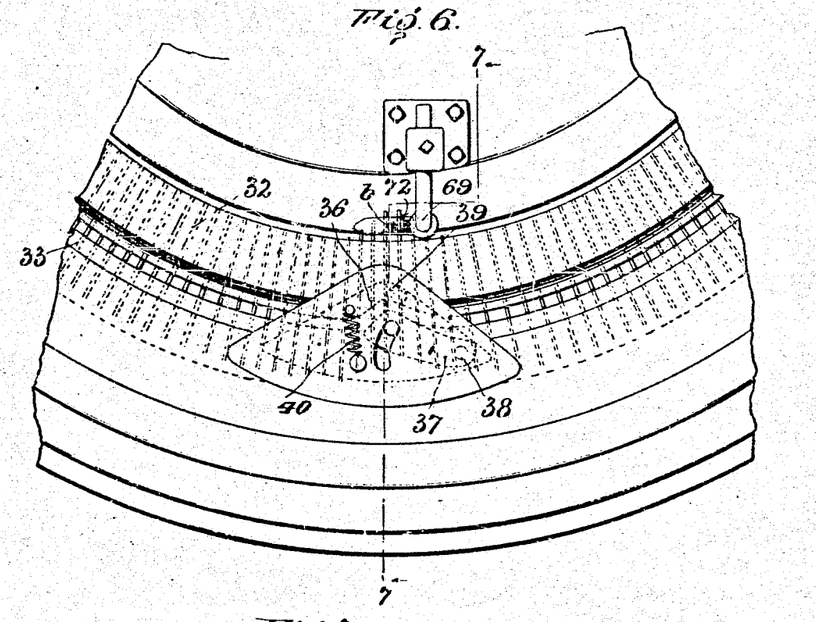
Fig. 6, is an enlarged detail plan view of the dial needles, and their operating cam.
Figure 7:
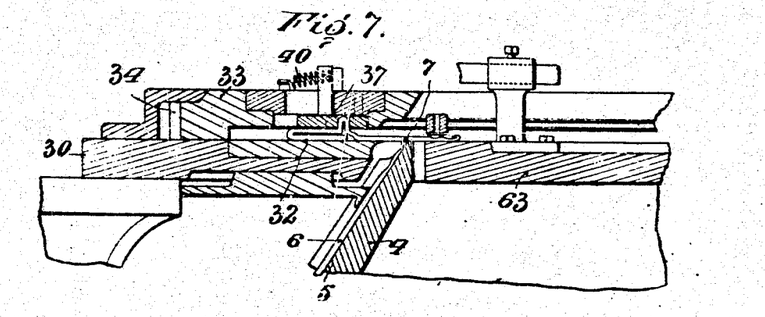
Fig. 7, is an enlarged detail section on the line 7—7 Fig. 6.
Figure 8:
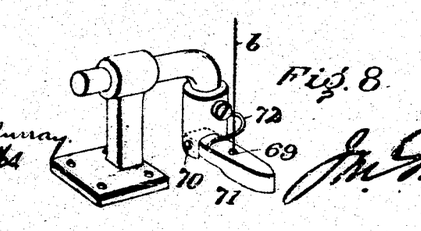
Fig. 8, is a detail view of one of the yarn guides.
Figure 17:
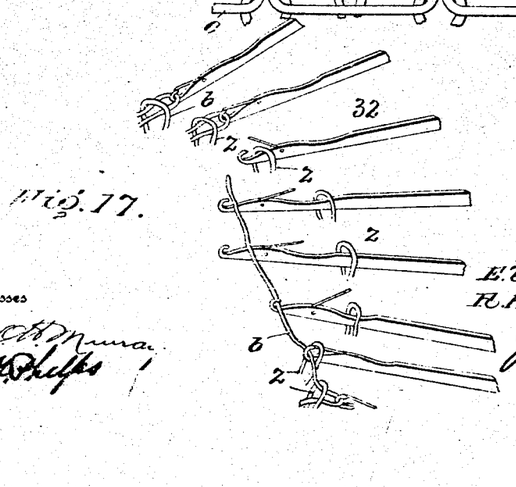
Fig. 17, is a similar view of the dial needles.

At the time the cylinder needles 6, and 6ᵃ, are elevated by the cam 17, the needle projecting cam 37, has projected the dial needles as shown in Fig. 17. The dial yarn b, is directed by its guide 69, over the tops of the projected needles 32, and when they are withdrawn the previously formed stitches Z, now back of the latches, will be cast off. Now when the retracting or stitch cam 36, retracts the needles 32, their hooks engage the yarn b, and draw the same through the previous loop Z, and of course the latter are cast off to form the knit stitches. These stitches being formed independently of another yarn at a different place than the stitches x, they are not knit into the loops of the latter, and the fabric from the needles 6 and 6ᵃ are independent but interengage and are only held together by the legs of the loop thereof. The stitches Z, are knit between the cylinder needles at the time the latter are elevated by the cam, at the point 80, see Fig. 3.

By the construction described we have provided two separate and distinct series of needles, each series operating to knit separate yarns, and one set in addition to knitting, serving to lay in a third or fleecing yarn to produce a fleeced lined fabric having on its front face all of the structural loops.

By providing a conical bed for the vertical needles we are enabled to make a much finer gage of knitted fabric than is possible with a machine having a plain cylinder bed, and we are also enabled to produce a fabric having a greater weight per yard, than has been produced heretofore.

What we claim is:

1. In a knitting machine, for knitting fabric containing a knitting yarn and a fleecing yarn, a circular series of latch knitting needles, a sinker wheel for the fleecing yarn rotating in a plane inclined to the axis of the series of needles working against the backs of the needles, means to project certain of the needles into engagement with the sinker wheel at a higher level than certain other needles, whereby the first-named needles will not take the fleecing yarn into their hooks, and whereby the second set of needles will enter the wheel behind the yarn and take it in their hooks, and means to operate the needles to knit with the knitting yarn.

2. In a knitting machine for knitting fabric containing a knitting yarn and a fleecing yarn, a circular series of latch knitting needles, means to support said needles, a sinker wheel for the fleecing yarn working in a plane inclined to and against the backs of the needles, means to project certain of the needles to a higher level than those which are not projected, whereby the first-named needles will not take the yarn into their hooks and whereby the remaining set of needles will take the yarn, means to operate the needles to knit with the knitting yarn, means acting on the fleecing yarn to force them below the free ends of the latches of the needles, a series of needles arranged at an angle to the circular series of latch needles to knit the knitting yarn, means for supporting said latter needles independent of the support for the circular series of latch needles.

3. In a knitting machine for knitting fabric containing a knitting yarn and a fleecing yarn, a circular set of latch needles having hooks extending outwardly or upwardly so as to draw stitches to the outside of the fabric, a carrier and operating cams for said needles, a second circular set of latch needles having hooks also extending outwardly or upwardly, a carrier for said needles holding them at an angle to the first-mentioned needles, means to operate said second set of needles to draw stitches in the same direction, means to supply each set of needles with separate yarns, means for operating the first set of needles, to knit, means for operating the second set of needles to knit at a point distant from the knitting point of the first set of needles, and means coöperating with one set of said needles between said knitting points for laying in a fleecing yarn.

4. In a knitting machine for knitting fabric containing a knitting yarn and a fleecing yarn, a circular set of latch knitting needles, a sinker wheel operating on the backs of the needles, means for operating on all the needles to project them from a normal position in advance of the sinker wheel, means for projecting certain of said needles farther than the adjacent needles, whereby the said adjacent needles take the fleecing yarn into their hooks, and whereby the hooks of the other needles will not take the yarn, a second series of latch needles, means to supply each set of needles with a separate knitting yarn, and means to independently operate on each set of needles to knit their respective yarns; the operation of the first mentioned set of needles laying in the fleecing yarn.

5. In a knitting machine for knitting fabric containing a knitting yarn and a fleecing yarn, a series of cylinder needles, means for operating the series of cylinder needles to form knit loops, a series of dial needles, means for operating the series of dial needles to knit, the cylinder needle and the dial needles operating to knit at distant points, a sinker wheel rotating in a plane inclined to the axis of the cylinder needles and working against the backs of the same to coöperate in positioning the fleecing yarn, said sinker wheel being located intermediate the knitting points of the cylinder and dial needles, means to project certain of the cylinder needles to a higher level than certain other of said cylinder needles, whereby the cylinder needles, elevated the highest, will not take the fleecing yarn into their hooks, and whereby the remainder of the cylinder needles will enter the wheel behind the fleecing yarn and take it in their hooks.

6. In a knitting machine, the combination of a circular series of dial needles having hooks extending outwardly and upwardly so as to draw stitches to the outside of the fabric, a carrier and operating cams for said dial needles, means to supply the dial needles with yarn, a second circular series of cylinder needles having latches and hooks extending outwardly or upwardly to draw stitches in the same direction, a carrier for said cylinder needles holding them at an angle to the dial needles, means to operate the cylinder needles, means to supply the cylinder needles with yarn at a point distant from the point where the dial needles are supplied with yarn, and a sinker wheel rotating in a plane inclined to the axis of the cylinder needles for supplying the latter with a fleecing yarn, the sinker wheel being located between the knitting points of the cylinder and dial needles.

7. In a knitting machine for knitting fabric containing knitting yarns and a fleecing yarn, a series of latch needles, a second set of latch needles operating at an angle to the first set of needles, means for operating the first set of needles to knit, means for operating the second set of needles to knit at a point distant from the point of operation of the first set of needles, means to supply each set of needles with separate yarn, an inclined sinker wheel operating on the inside of one set of needles, means to supply a fleecing yarn to the sinker wheel, means projecting certain of the latter series of needles to cause their points to pass into the teeth of the sinker wheel, means operating subsequently but before contact with the sinker wheel to project the remaining needles of the said set farther than the ends of the aforesaid projected needles, whereby the farthermost projected needles will not take yarn into their hooks, and whereby the remaining projecting needles will take the yarn.

8. In a knitting machine for knitting fabric containing knitting yarns and a fleecing yarn, a circular series of latch knitting needles, a sinker for the fleecing yarn working against the backs of said needles, a cam to project certain of the needles from their normal position in advance of the sinker wheel, a cam to subsequently project the remaining needles, whereby the first projected needles will not take the yarn into their hooks, and whereby the second set of needles will take the yarn, a cam to operate said needles to cause them to knit, a circular series of dial latch needles coöperating with the first mentioned latch needles, means supplying separate yarn to the said dial latch needles, and a cam for operating the dial latch needles to cause them to knit at a point distant from the point where the first mentioned latch needles knit.

9. A machine for knitting fabric containing a plurality of knitting yarns and a fleecing yarn, two sets of latch needles having their hooks opening in the same direction and means to support said needles, means for feeding each set of needles with separate knitting yarn, and means for operating said needles to knit upon each set with its own yarn only at distant points so that the loops of each yarn are drawn through the loops of its own kind only and the loops of the knitting yarns appear in wales on one face of the fabric, and means coöperating with less than all of the needles of one set only to place the fleecing yarn on the hook side of said needles and beneath their latches, whereby the fleecing yarn will engage between less than all of the connecting legs of the loops formed by one set and on the opposite face of the fabric.

10. A machine for knitting fabric containing a plurality of knitting yarns and a fleecing yarn, two sets of latch needles having their hooks opening in the same direction, and means to support said needles, means for feeding each set of needles with a separate knitting yarn, and means for operating said needles to knit upon each set with its own yarn at distant points so that the loops of each yarn are drawn through the loops of its own kind only and the loop of the knitting yarns appear in wales on one face of the fabric, and a sinker wheel rotating in a plane inclined to the axis of one set of needles, and means operating the said set of needles to coöperate with the inclined sinker wheel to place some of the needles in front of the yarn on said wheel and others behind said yarn.

11. In a knitting machine for knitting fabric containing knitting yarn and a fleecing yarn, a circular set of latch needles having hooks extending outwardly and upwardly so as to draw stitches to the outside of the fabric, a carrier and operating cams for said needles, a second circular set of latch needles having hooks also extending outwardly or upwardly, a carrier for said needles holding them at an angle to the first-mentioned needles, means to operate said second set of needles to draw stitches in the same direction, means to supply each set of needles with separate yarns, means for operating the first set of needles to knit, means to operate the second set of needles to knit, and means to operate one set of needles at the knitting point of the other set to slightly withdraw said former set from normal position to avoid entanglement of the loops of the respective sets of needles.

12. In a knitting machine, a circular series of needles having hooks facing in the same direction, means to supply yarn, and means to operate said needles to knit, and a sinker wheel carrying a yarn to be included in the fabric working in an inclined plane and intermeshing with the needles upon the side opposite their hooks, means to cause certain of the needles to move past the sinker wheel with their hook ends positioned substantially in the horizontal plane intersecting the center of the wheel, and means to cause other of the needles to move past said wheel at a higher level.

13. In a knitting machine for knitting fabric containing a knitting yarn and a fleecing yarn, a circular series of dial needles having their hooks extending outwardly and upwardly, means for supporting the dial needles, cams for operating the dial needles, means for supplying knitting yarn to the dial needles, a series of cylinder needles having their hooks extending upwardly or outwardly, a support for the cylinder needles, a sinker wheel mounted in the back of the cylinder needles and above the plane of operation of the dial needles, said sinker wheel rotating in a plane inclined to the axis of the cylinder needles to coöperate in placing a fleecing yarn on said cylinder needles, a cam for projecting all of the cylinder needles beyond the plane of the dial needles, and means for projecting certain of the elevated cylinder needles in advance of the sinker wheel at a higher level than certain other needles, whereby the first-mentioned cylinder needles will not take the fleecing yarn into their hooks, and whereby the second set of needles will enter the wheel behind the yarn and take it in their hooks.

In testimony whereof we affix our signatures in presence of two witnesses.

EUGENE VERMILYEA.
RALPH HAMMERSLEY.

Witnesses:
 OSCAR M. BAKER,
 W. WARREN STEENBERGH.